INVENTOR
WILLIAM B. ARCHEY

BY W.E.Higgins
ATTORNEY

United States Patent Office 3,525,638
Patented Aug. 25, 1970

3,525,638
MAGNETOSTRICTION CONTROL IN
MAGNETIC THIN FILMS
William B. Archey, Shelburne, Vt., assignor to International Business Machines Corporation, Armonk, N.Y., a corporation of New York
Filed Sept. 20, 1967, Ser. No. 669,053
Int. Cl. C23c 13/04
U.S. Cl. 117—240        11 Claims

ABSTRACT OF THE DISCLOSURE

Magnetostriction shift in a process for producing a series of nickel-iron base magnetic thin films is decreased by decreasing the rate of deposition of the nickel-iron base film as a function of time during the production of a series of films. This procedure decreases the variation in magnetostriction between films produced at the beginning and films produced at the end of a series.

BACKGROUND OF THE INVENTION

This invention relates to a process for controlling magnetostriction in the production of a series of nickel-iron magnetic thin films by a vacuum deposition process. More particularly, it relates to a process for decreasing the magnetostriction shift between magnetic films produced at the beginning of a series and those produced at its end.

As used herein, the term, "vacuum," is used in its practical rather than its scientific sense. That is, it refers to a low pressure environment of between about $1 \times 10^{-4}$ and about $1 \times 10^{-7}$ torr or lower. The term, "vacuum deposition process," refers to those processes for depositing a nickel-iron base alloy by vacuum evaporation on a suitable substrate in the presence of a magnetic field. The term, "magnetostriction," refers to the change in the magnetization vector of a film induced by stresses on the film, and the term, "magnetostriction shift," refers to a variation in magnetostriction between different films in a series.

The production of magnetic thin films from deposition of nickel-iron base alloy by vacuum evaporation on a substrate in the presence of a magnetic field is known, as described in U.S. Pat. 2,853,402 to Blois and U.S. Pat. 2,900,282 to Reubens. Most magnetic thin films so produced are made in "single shot" evaporators, which can produce only one or two sets of films per pump-down. Such single shot processes are not well suited to large scale production, and they make the production of large numbers of magnetic films having uniform properties difficult.

For these and other reasons, attempts have been made to produce a series of thin films in a single pump-down. However, a problem associated with such methods is that the magnetic properties, particularly the magnetostriction, of the films so produced shift between films produced at the beginning of a series and those produced at its end. One reason for this is the difference in vapor pressure between nickel and iron, which results in changing of the nickel-iron alloy source composition and hence vapor and film composition during the series.

With respect to magnetostriction, it has been proposed to begin the run of a series of films with an alloy melt giving a magnetostriction near the positive magnetostriction tolerance level, then allow the magnetostriction to decrease and become negative as a result of changes in the alloy melt composition until the negative magnetostriction tolerance level is reached. This solution means that a number of films produced at the beginning and at the end of a run are off specifications, and it also means that there is a built-in variation between magnetic thin films produced at different times in the series.

Another proposed solution has been to add iron to the alloy melt as the melt becomes more nickel-rich (due to the higher vapor pressure of iron), thus making the melt composition more constant with time. However, such a method requires complex alloy feed mechanisms and requires close control, since very small changes in melt compositions can have very large effects on magnetic properties.

It is therefore an object of this invention to provide a method for decreasing magnetostriction shift from the beginning to the end of production of a series of magnetic thin films.

A further object of the invention is to decrease the amount of alloy melt compensation for magnetostriction shift required in the production of a series of magnetic thin films from a batch alloy feed.

Yet another object of the invention is to make additions to the alloy melt unnecessary during the production of a series of magnetic thin films.

A further special object of the invention is to increase the consistency in magnetic properties between magnetic thin films produced at different times in a series from a batch alloy feed.

SUMMARY OF THE INVENTION

It has now been discovered that magnetostriction shift in a vacuum deposition process for producing a series of nickel-iron base magnetic thin films may be decreased by decreasing the rate of deposition of the nickel-iron base film as a function of time as the series of films is produced. The process of the present invention, therefore, is for the vacuum deposition of a series of nickel-iron base magnetic thin films and comprises:

(1) depositing the nickel-iron base films at a rate suitable for producing magnetic thin films, and (2) decreasing the rate of deposition as a function of time a sufficient amount to decrease the shift in magnetostriction as the series of films is produced.

By decreasing the rate of deposition in this manner, it is possible to produce a series of magnetic thin films having only a very slight difference in magnetostriction between films produced at the beginning of a series and those produced at its end. This is true even though, in the deposition rate range studied, the nickel-iron film composition remains substantially unaltered from the nickel-iron film composition obtained at a constant deposition rate.

The foregoing and other objects, features, and advantages of the invention will be apparent from the following more particular description of the preferred embodiments of the invention, as illustrated in the accompanying drawings.

DESCRIPTION OF THE PREFERRED EMBODIMENTS

The process of this invention is operable at essentially any deposition rate suitable for producing magnetic thin films. Thus, rates, of deposition of from about 35 angstroms per second to about 5 angstroms per second are generally employed. Best results in maintaining the other magnetic properties, such as anisotropy field, coercive force, skew, and the like at desired levels are obtained if the rate of deposition is maintained between about 21 angstroms and about 7 angstroms per second.

The rate of decrease in deposition sufficient to decrease the magnetostriction shift will depend to a large extent on the vacuum system employed. This means that each different system employing the technique of this invention will have to be calibrated individually for best results. However, it can be stated that for most vacuum systems suitable for the production of nickel-iron base magnetic thin films, a rate of deposition decrease of from about 30 angstroms per second per hour to about 10 angstroms per second per hour is operable.

The process of this invention may be practiced with essentially any nickel-iron base alloy suitable for making magnetic thin films. Such alloys usually contain about a 4:1 to 5:1 weight ratio of nickel to iron and may additionally contain up to 10 weight percent of one or more other components, such as cobalt, chromium, palladium, copper, manganese, platinum, gold, or the like.

The process of this invention may be used to prepare films of thicknesses having usefulness as magnetic thin films, i.e., generally in the range of from about 100 to about 2,000 angstroms, advantageously between about 200 and 1,200 angstroms, and preferably between about 250 and 500 angstroms. The optimum conditions for the present process are for the production of a nickel iron base (additionally containing 0 to 10 weight percent cobalt) magnetic thin film of about 400 angstroms thickness at a deposition rate beginning at about 21 angstroms per second and decreasing to about 7 angstroms per second at the rate of about 14 angstroms per second per hour.

The process of the present invention is suitable for essentially any vacuum deposition process for producing a series of nickel-iron base magnetic thin films. The conditions of vacuum, magnetic field, temperature, and the like suitable for the production of nickel-iron base magnetic thin films are known in the art, and are taught in the Blois and Reubens patents cited above, the disclosures of which are incorporated by reference herein.

Figure 1:
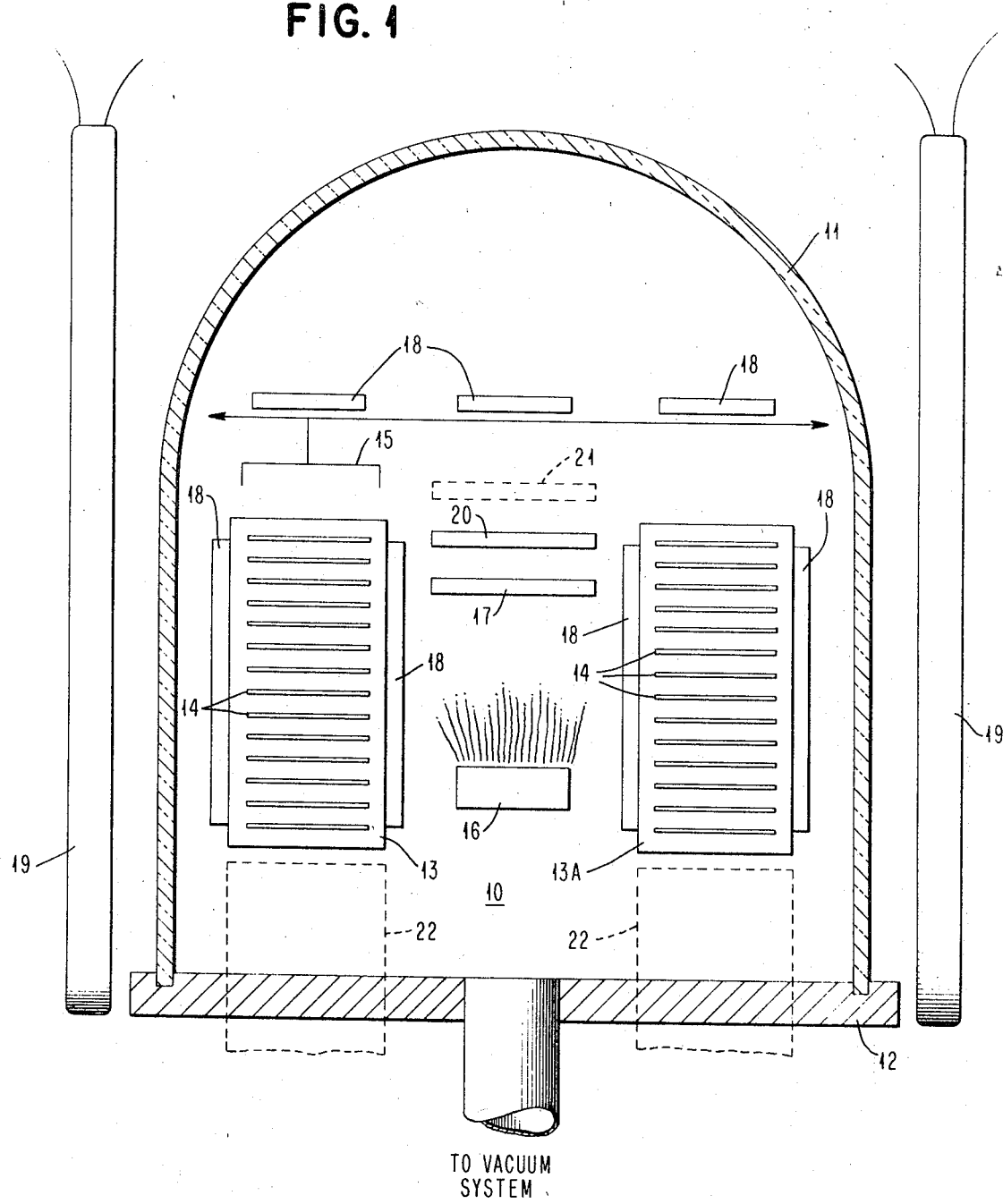
FIG. 1 is a schematic diagram of apparatus suitable for practicing the invention.

FIG. 1 in the drawings is a schematic diagram of a preferred embodiment of a vacuum deposition apparatus and process. The apparatus shown comprises a chamber 10, desirably formed by a bell jar 11 sealed against a base plate 12 and maintained under vacuum by means of a vacuum system (not shown). Inside the bell jar are elevating means 13 and 13A for raising and lowering substrates 14 to a lateral substrate transport means 15. The apparatus additionally comprises one or more vapor sources 16, a shutter 20 (desirably of the focal plane type), and a plurality of heaters 18 located at points in the chamber to give even heating of the substrates. A pair of Helmholtz coils 19 are positioned (desirably outside the bell jar) to create a uniform magnetic field across the substrate. The apparatus is also desirably provided with a deposition rate monitor 17, such as an ion gauge or the like.

In operation, a plurality of substrates 14 suitable for deposition thereon of magnetic films (desirably smoothed copper plates) are loaded into one of the elevating means 13 and 13A. The vacuum chamber 10 is sealed and a reduced pressure produced, desirably of about $2 \times 10^{-6}$ Torr. The substrates are fed serially to the lateral substrate transport 15, which moves them to deposition position 21 as shown. The direction of travel of the substrates is parallel to the magnetic field generated by the external Helmholtz coils 19. The field direction in worst case substrate positions is desirably not more than about 0.6 degree out of parallel with the magnetic field at the center of the system, and the magnetic field is desirably from about 20 to about 40 oersteds. The heaters 18 are activated to produce the desired substrate temperature for deposition (usually between about 200 degrees and 400 degrees centigrade).

Usually, before the magnetic thin film itself is deposited, one or more smoothing layers, desirably of SiO or chromium, are deposited on the substrates. This is done by providing a source 16 for the smoothing layer, heating the source a sufficient extent to give the deposition rate desired as measured by the deposition rate monitor 17, opening the shutter 20, and exposing the substrate to the resulting vapor for a time sufficient to give the desired thickness of smoothing layer. After deposition, the substrate is moved by the transport means 15 to the other elevating means, where it is stored until all of the substrates have been coated with the smoothing layer. This process may be repeated as many times and with as many different smoothing layers as is desired.

After the smoothing layers have been deposited on the substrates, the nickel-iron base magnetic thin film is deposited in a similar fashion. As the substrates are exposed to the nickel-iron base vapor in series, the deposition rate of the vapor is decreased (desirably by decreasing the temperature of the vapor source 16) a sufficient extent to decrease the magnetostriction shift in the resulting thin films.

Figure 2:
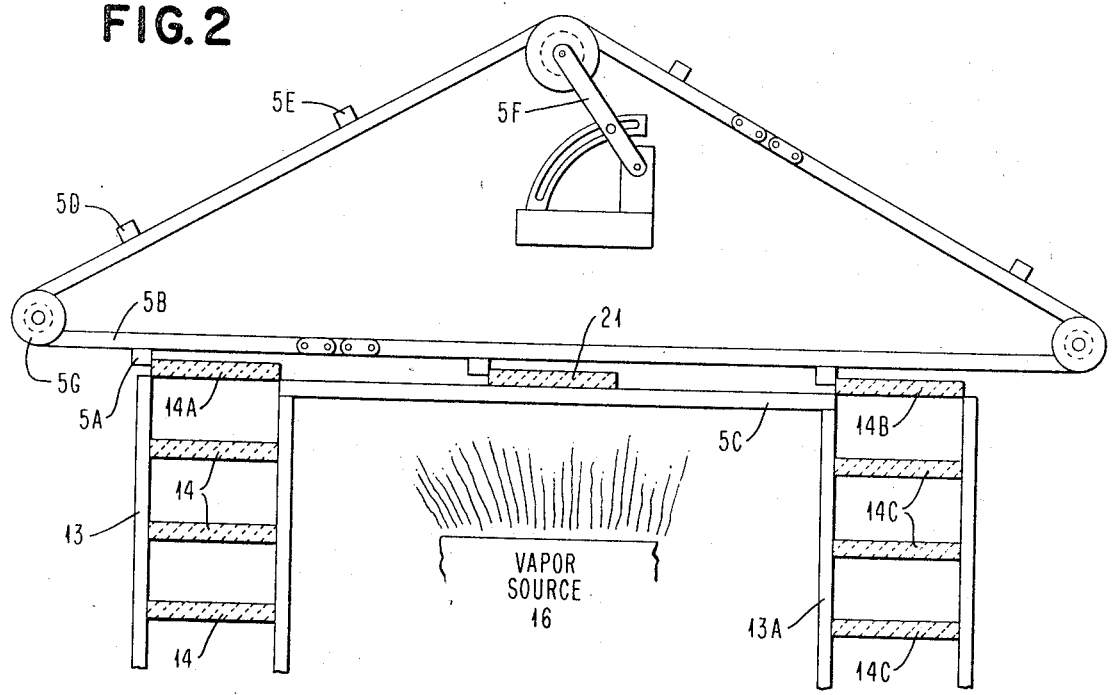
FIG. 2 is a more detailed drawing of a suitable mechanism for transporting substrates in the apparatus of FIG. 1.

FIG. 2 shows an especially preferred endless belt substrate transport mechanism. In operation, substrates 14 are stored in the left vertical elevator system 13 which allows individual substrates 14 to be brought into position 14A prior to deposition. When a substrate 14 is in the 14A position, it is engaged by guide bar 5A attached to endless chain conveyor belt 5B which moves the substrate to deposition position 21, by guiding it along substrate carrier guide rail 5C. At deposition position 21, vapor from the vapor source 16 contacts the substrate. After deposition, the substrate is moved to storage position 14B. As the substrate is moved from position 21 to 14B, guide bar 5D engages the next substrate 14 moved into position 14A by the elevator system 13 and moves it to position 21. Concurrently, guide bar 5E comes into the position formerly occupied by guide bars 5D and 5A. As deposition occurs on the second substrate at position 21, the first substrate, now at position 14B, is lowered into storage position 14C within the right elevator 13A. Conveyor belt speed is controlled through sprocket 5G driven by an electric motor, not shown. Chain tension is maintained through adjustment system 5F.

Thus, in operation, while a first substrate is being lowered into a storage position 14C after deposition, a second substrate is being deposited on at position 21, while a third substrate at position 14A is being readied for deposition. The system therefore allows maximum time utilization.

When all substrates from one elevator 13 have been transferred to the other elevator 13A, it may be desirable to put a second vacuum deposition on them. The deposited material may be the same or different from that of the first deposition. To accomplish this, the system is merely reversed, such that substrates in position 14C are moved into position 14B, moved to deposition position 21 by the guide bars on chain 5B, and then moved after deposition to position 14A for storage in positions 14 in left elevator 13. The capacity of the system is limited only by the physical size of the substrate and the elevator and chain drive system. The number of depositions of different materials is limited only by the number of vapor sources available.

It is apparent to those skilled in the art that modifications may be made in the above device and procedure while still practicing the essential features of this invention. For example, a different means may be used to advance the substrates serially to the deposition position. Additionally, the device may be equipped with an input-output means 22 for removing substrates that have been coated with the magnetic thin film and introducing new substrates to be coated without breaking the vacuum.

The following non-limiting examples represented preferred embodiments and describe the invention further.

Example I

A series of thirty (30) copper plates deposited with an SiO smoothing layer two microns thick was coated with a magnetic thin film of 250 angstroms thickness from a source containing a 79.8 weight percent nickel–17.2 weight percent iron–3.0 weight percent cobalt alloy, using a vapor deposition apparatus of the type described above. The deposition rate was varied between 25 angstroms per second and 2.5 angstroms per second, randomly at first and then in a gradually sloping manner.

Deposition of the SiO smoothing layer was at a substrate temperature of 340 degrees centigrade. This temperature was also maintained during deposition of the magnetic thin film. A magnetic field of 30 oersteds was applied across the substrates during the latter deposition and maintained until cooling of the substrates to about 100 degrees centigrade.

For each of the 30 films so prepared, the magnetostriction constant was determined by application of bending stress to the substrates at an angle of 45 degrees to the easy axis, giving magnetostriction data in terms of angular easy axis rotation ($\Delta B_{10}$). The rotation was measured under fixed substrate and stress parameters to hold strain constant. Magnetostriction data expressed as angular easy axis rotation may be converted to the conventional magnetostriction constant by the relationship:

$$\lambda_s = M_s H_k \tan(2\Delta B_{10})/3\sigma$$

derived by Mitchell et al., J. Appl. Phy. 34, 715 (1963), wherein:

$\lambda_s$=Magnetostriction coefficient at saturation
$M_s$=Saturation magnetization
$H_K$=Anisotropy field
$\sigma$=Stress in the magnetic film
$\Delta B_{10}$=Angular easy axis rotation The film composition in each case was measured by X-ray fluorescence analysis of a small glass substrate coated during each deposition. The films had an initial composition of about 79 weight percent nickel, 18 weight percent iron, and 3 weight percent cobalt, and a final composition of about 80.5 weight percent nickel, 16.5 weight percent iron, and 3 weight percent cobalt.

The magnetostriction shift of the 30 films so produced was plotted and found to slope the least with time in that portion of the series where a decreasing deposition rate (20 angstroms per second per hour) had been employed. This slope corresponded to a change of 1.3 degrees angular easy axis rotation over a time period equal to one third of the total series. In contrast, when 30 substrates were deposited with the same nickel iron base alloy at a constant deposition rate of 17 angstroms per second, the films so produced had an angular easy axis rotation at the beginning of the series of about 5.5 degrees, and a final angular easy axis rotation at the conclusion of the series of about −3.5 degrees, giving a maximum change of 9 degrees for the whole series or 3 degrees over one third of the series.

Other magnetic properties at five points on each film were measured and demonstrate that, while many of the films of the series are not suitable for use as magnetic thin film memory elements, those in the portion where the decreasing rate was employed were all acceptable. The results obtained for these other properties shown in Table I below.

TABLE I

| Property | Extreme Range Observed Over Decreasing Rate Portion | Extreme Range Observed Over Entire Series |
|---|---|---|
| Coercive force ($H_o$) (oe.) | 3.6–5.4 | 3.6–11.0 |
| Anisotropy field ($H_{ko}$) (oe.) | 6.6–7.8 | 6.0–8.4 |
| Dispersion ($\alpha_{90}$) (degrees) | 0.9–2.2 | 0.9–3.8 |
| Skew ($\beta$) (degrees) | −2.2–+1.3 | −2.2–+1.3 |
| Skew Deviation ($\Delta\beta$) (degrees) | 0.8–3.9 | 0.8–3.9 |

It is understood to anyone skilled in the magnetic film art that substitution of other nickel-iron base alloys containing such additions as cobalt, chromium, palladium, copper, manganese, platinum, gold, or the like, gives similar advantageous results.

EXAMPLE II

Example I was repeated with the following changes:

(A) Melt composition was changed from 79.8 wt. percent Ni–17.2 wt. percent Fe–3 wt. percent Co to 79.6 wt. percent Ni–17.4 wt. percent Fe–3 wt. percent Co.

(B) After SiO deposition but prior to magnetic film application the 30 plates in the apparatus were maintained at a temperature of 340 degrees centigrade with a pressure of about $8 \times 10^{-6}$ Torr to stabilize the vacuum system.

(C) The deposition rate was sloped downward for the entire series of 30 substrates from an initial value of 35 angstroms per second to 3.5 angstroms per second in nine steps giving a rate of deposition decrease of about 30 angstroms per second per hour.

(D) The film thickness applied to each of the series of 30 substrates was 350 angstroms.

Initial and final compositions for the films in this series were essentially identical to those given in Example I.

In this case, a plot of the magnetostriction shift showed a change from −2 degrees to −4.3 degrees angular easy axis rotation from the first to last in the series, or a shift of 2.3 degrees for a series of 30 substrates.

As in Example I, other magnetic properties of the films were measured, and demonstrate that the films are suitable for use as magnetic thin film memory elements. The results obtained for these other properties are shown in Table II below.

TABLE II

| Property: | Extreme range over entire series |
|---|---|
| Coercive force ($H_o$) | 2.8 to 4.9 oe. |
| Anisotropy field ($H_{ko}$) | 6.5 to 7.1 oe. |
| Dispersion ($\alpha_{90}$) | 1.1° to 2.4°. |
| Skew ($\beta$) | +0.2° to −3.4°. |
| Skew deviation ($\Delta\beta$) | 0.8° to 6.4°. |

EXAMPLE III

Figure 3:
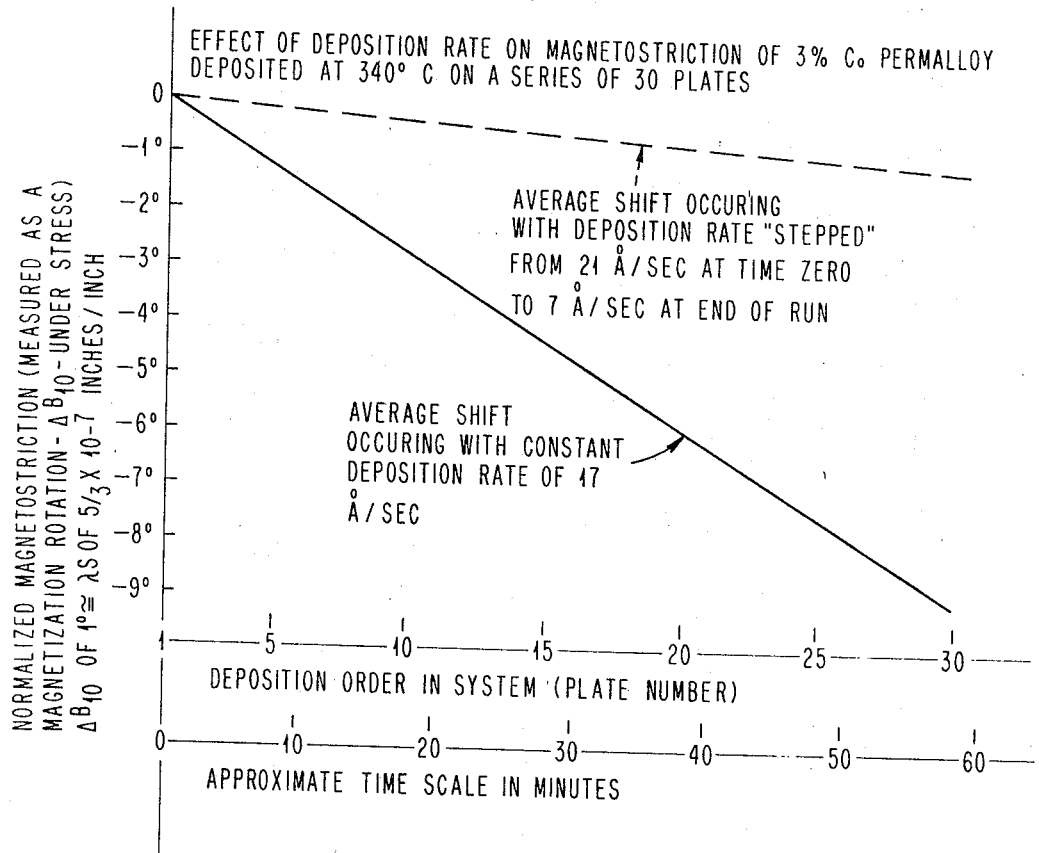
FIG. 3 is a graph showing an example of the improvement in magnetostriction control obtained by the present invention.

During the work reported in the Example II, it was noted that skew deviation, i.e., the variation in easy axis skew or angle between the intended and actual easy axis of the film, was at a minimum in the deposition rate range of 21 angstroms per second to 7 angstroms per second. Therefore, the procedure of Example II was repeated, but with an initial deposition rate of 21 angstroms per second, decreased in four equal steps of 3.5 angstroms per second each to a final deposition rate of 7 angstroms per second. The deposition conditions and results obtained are shown in FIG. 3, along with a comparative run under the same temperature and pressure conditions with a constant deposition rate of 17 angstroms per second. These results are normalized for comparison purposes. As shown, with a decreasing deposition rate of about 14 angstroms per second per hour, a magnetostriction shift of only about 1.2 degrees was obtained. With the constant deposition rate of 17 angstroms per second, a magnetostriction shift of about 9 degrees was observed.

As in Examples I and II, the other magnetic properties of the films were measured, with the results shown in Table III below.

TABLE III

| Property: | Extreme range |
|---|---|
| Coercive force ($H_o$) | 4.8 to 6.7 oe. |
| Anisotropy ($H_{ko}$) | 6.0 to 7.5 oe. |
| Dispersion ($\alpha_{90}$) | 0.2° to 3.1°. |
| Skew ($\beta$) | +0.3° to −1.9°. |
| Skew deviation ($\Delta\beta$) | 2.2° maximum. |

EXAMPLE IV

If SiO coated plates as in Example III were exposed to the air atmosphere before deposition of the magnetic thin film, the magnetostriction values tended to become more positive by a factor of about 4 degrees angular easy axis rotation. Such treatment also causes a shift in the observed range of coercive force ($H_o$). Using plates that had been exposed to the air atmosphere at about 20 degrees C. (room temperature) for about three days and varying the deposition rate under the same conditions as in Example III, a magnetostriction shift of 2.9 degrees angular easy axis rotation was observed, compared to the shift of 9 degrees observed with a constant deposition rate. This is evidence that the magnetostriction control technique described herein can be practiced independently of other magnetic film deposition parameters.

The other magnetic properties of the films so produced are shown below in Table IV.

TABLE IV

| Property: | Extreme range |
|---|---|
| Coercive force ($H_o$) | 1.3 to 3.0 oe. |
| Anisotropy field ($H_{ko}$) | 6.0 to 7.5 oe. |
| Dispersion ($\alpha_{90}$) | Less than 1°. |
| Skew ($\beta$) | +0.3° to −1.5°. |
| Skew deviation ($\Delta\beta$) | 1.8° maximum. |

CONCLUSION

The above description shows that a method has been provided for decreasing magnetostriction shift from the beginning to the end of production of a series of magnetic thin films, thus permitting a decrease in the amount of alloy melt compensation for magnetostriction shift required. The small shift in magnetostriction obtained makes additions to the alloy melt unnecessary during the production of a series of magnetic thin films. Also, the process described increases the consistency in magnetic properties between magnetic thin films produced at different times in a series from a batch alloy feed.

What is claimed is:

1. In a continuous vacuum evaporation process for producing a series of nickel-iron base magnetic thin films on a substrate, the improvement for decreasing magnetostriction shift which comprises:
   (1) depositing the nickel-iron base film at a rate suitable for producing magnetic thin films, and
   (2) decreasing the rate of deposition as a function of time a sufficient amount to decrease the shift in magnetostriction as the series of films is produced.

2. The process of claim 1 wherein the rate of deposition decrease is from about 30 angstroms per second per hour to about 10 angstroms per second per hour.

3. The process of claim 2 wherein the magnetic thin films so produced have a thickness of from about 100 angstroms to about 1,200 angstroms.

4. The process of claim 1 wherein the magnetic thin films so produced have a thickness of from about 100 angstroms to about 1,200 angstroms.

5. The process of claim 1 wherein the rate of deposition is from about 35 angstroms per second to about 5 angstroms per second.

6. The process of claim 5 wherein the rate of deposition decrease is from about 30 angstroms per second per hour to about 10 angstroms per second per hour.

7. The process of claim 6 wherein the magnetic thin films so produced have a thickness of from about 100 angstroms to about 1,200 angstroms.

8. The process of claim 6 wherein the magnetic thin films so produced have a thickness of from about 200 angstroms to about 500 angstroms.

9. The process of claim 1 wherein the rate of deposition decrease is about 14 angstroms per second per hour and wherein the rate of deposition is from about 21 angstroms per second to about 7 angstroms per second.

10. The process of claim 9 wherein the magnetic thin films so produced have a thickness of about 350 angstroms.

11. The process of claim 1 wherein the magnetic thin films so produced have a thickness from about 200 angstroms to about 500 angstroms.

References Cited

UNITED STATES PATENTS

| | | | |
|---|---|---|---|
| 2,853,402 | 9/1958 | Blois | 117—238 |
| 2,900,282 | 8/1959 | Rubens | 117—107 X |
| 3,065,105 | 11/1962 | Porter | 117—107 X |
| 3,104,180 | 9/1963 | Voulton-Baudin | 117—107.1 X |
| 3,336,154 | 8/1967 | Oberg et al. | 117—107 X |

OTHER REFERENCES

Powell et al.: Vapor Deposition, May 10, 1966, pp. 242 to 246 relied upon.

ALFRED L. LEAVITT, Primary Examiner

W. E. BALL, Assistant Examiner

U.S. Cl. X.R.

117—107, 107.1